United States Patent [19]
Hathcock

[11] Patent Number: 5,479,711
[45] Date of Patent: Jan. 2, 1996

[54] ORBITAL AND ADJUSTABLE CANT MECHANISM FOR RECIPROCATING SAWS

[75] Inventor: Mary H. Hathcock, New Bern, N.C.

[73] Assignee: S-B Power Tool Company, Chicago, Ill.

[21] Appl. No.: 417,931

[22] Filed: Apr. 6, 1995

[51] Int. Cl.⁶ .................................................. B23D 49/16
[52] U.S. Cl. .................................. 30/393; 30/394; 83/646
[58] Field of Search .............. 30/392–394; 279/19–19.7; 83/646

[56] References Cited

U.S. PATENT DOCUMENTS

| | | |
|---|---|---|
| 2,621,685 | 1/1949 | Butz . |
| 2,722,244 | 11/1955 | Schultz ...................................... 30/294 |
| 2,946,358 | 11/1958 | Bruck . |
| 3,802,079 | 4/1974 | Ketchpel, Jr. et al. .................... 30/394 |
| 3,942,251 | 3/1976 | Griffies et al. ............................. 30/394 |
| 3,945,120 | 3/1976 | Ritz . |
| 4,137,632 | 2/1979 | Pfanzer . |
| 4,379,362 | 4/1983 | Getts . |
| 4,550,501 | 11/1985 | Moores, Jr. . |
| 4,628,605 | 12/1986 | Clowers . |
| 5,212,887 | 5/1993 | Farmerie .................................... 30/393 |

Primary Examiner—Douglas D. Watts
Attorney, Agent, or Firm—Jones, Day, Reavis & Pogue

[57] ABSTRACT

The housing of the reciprocating saw includes rectilinear guide bars mounting a drive block for reciprocating movement by the motor of the power tool. The drive block has a recess defining arcuate cam surfaces. A blade clamp has a cam follower engaging the arcuate cam surfaces of the drive block. When the blade engages the work, relative movement between the cam follower and the arcuate cam surfaces on the drive block causes orbital movement to be imparted to the working end of the saw blade. Means are provided for clamping the blade holder to the drive block in two different positions. This clamping deactivates the orbital mechanism and permits the blade to be locked in two different cant positions relative to the axis of reciprocation of the drive block.

8 Claims, 3 Drawing Sheets

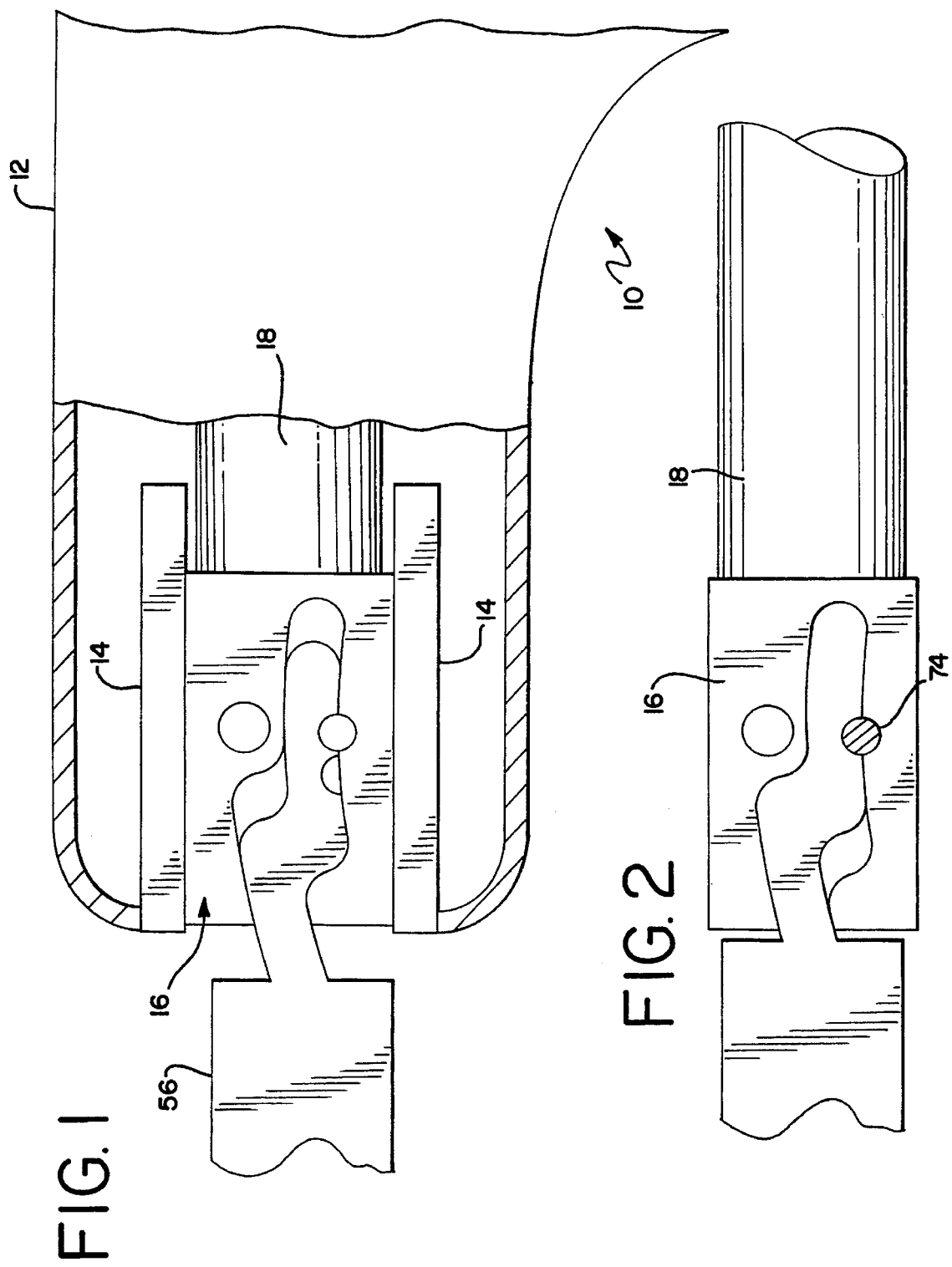

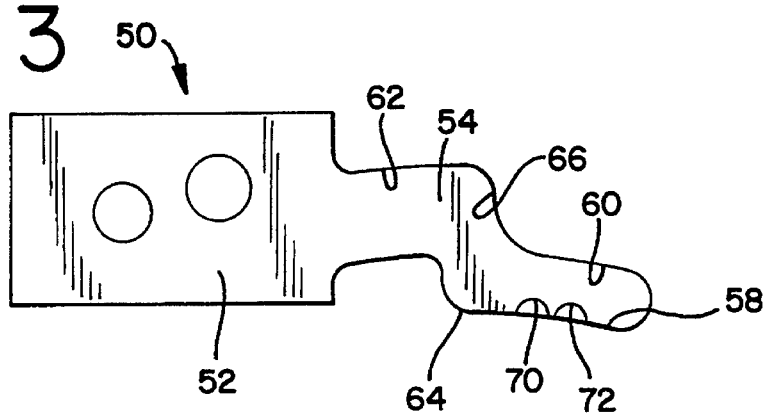
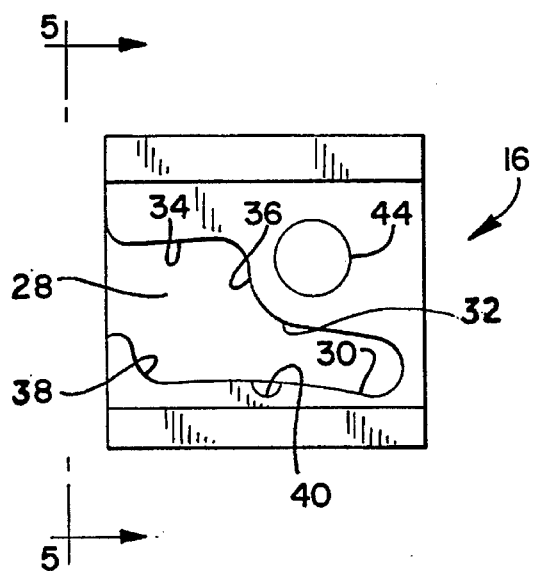
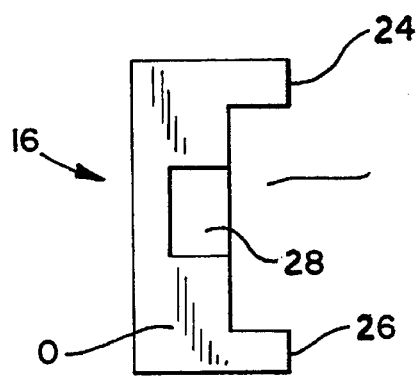
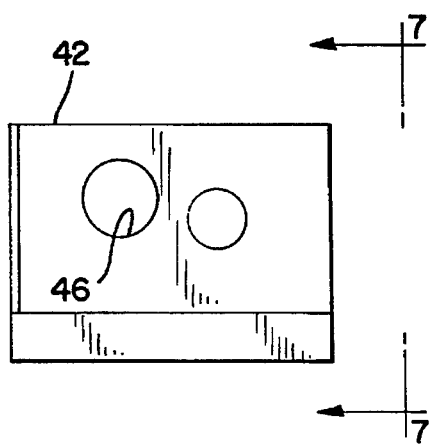
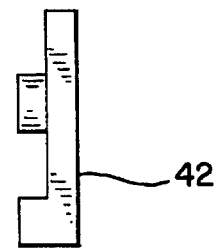

5,479,711

ORBITAL AND ADJUSTABLE CANT MECHANISM FOR RECIPROCATING SAWS

The present invention relates to power operated, reciprocating saws, such as so-called recipro saws and jig saws. More particularly, the present invention relates to mechanism for imparting an orbital movement to the working portion of the saw blade.

BACKGROUND OF THE INVENTION

It is well known to those skilled in the art that in certain types of cutting operations, it is desirable to impart an orbital movement to the working portion of the rectilinear saw blade. The prior art is replete with mechanisms to provide such orbital movement. Representative prior art are U.S. Pat. Nos. 2,946,358; 3,945,120; 4,137,632; 4,379,362; 4,550, 501; and 4,628,605.

These prior art mechanisms suffer from several disadvantages. These mechanisms require a significant number of moving parts thus increasing the cost of manufacture of the reciprocating power tool. Further, tools incorporating these orbital mechanisms require more maintenance than normally is the case. Finally, such tools have a greater likelihood of malfunction in view of the number of moving parts involved.

To enhance the versatility of a reciprocating saw of the type under consideration, it is desirable to be able to change the angle of inclination, or cant angle, of the blade with respect to the reciprocating plunger when orbital movement is not being imparted to the blade. U.S. Pat. No. 3,802,079 discloses a mechanism for mounting a blade in two reverse positions at different inclinations. However, the device of this patent is not capable of providing orbital movement when desired.

SUMMARY AND OBJECTS OF THE INVENTION

The present invention provides a simplified but effective mechanism for imparting orbital movement to the working end of a reciprocating saw blade. Further, the invention provides means for deactivating the orbital mechanism and permitting the saw blade to be fixed in a desired angle of inclination or cant with respect to the reciprocating plunger of the power tool.

A primary object of the invention is the provision of a new orbital mechanism for a reciprocating saw blade.

Another object of the invention is the provision of an orbital mechanism for a reciprocating saw which requires a minimum of moving parts by utilizing the frictional engagement between the saw blade and the work to actuate the orbital mechanism.

Still another object of the present invention is the provision of an orbital mechanism for a reciprocating saw blade wherein a portion of the orbital mechanism serves to mount the saw blade.

Yet another object of the present invention is the provision of an orbital mechanism for a reciprocating saw blade wherein such mechanism may be deactivated thereby permitting the blade to be adjusted to a desired angle of inclination or cant with respect to the reciprocating plunger.

Another object of the present invention is the provision of an orbital mechanism for a reciprocating saw which can be used as an attachment to convert a reciprocating saw without orbital action into a reciprocating saw with orbital action.

These and other objects and advantages of the present invention become apparent from a review of the following specification.

DESCRIPTION OF THE DRAWINGS

FIG. 1 is a fragmentary view, partly in elevation and partly in section, of a power tool incorporating the orbital and adjustable cant mechanism of the present invention;

FIG. 2 is a somewhat schematic view showing parts of the orbital mechanism in a relationship different than that shown in FIG. 1;

FIG. 3 is a side elevational view of the blade clamp and cam follower forming part of the orbital mechanism of the present invention;

FIG. 4 is a side elevational view of the reciprocating drive block forming part of the orbital mechanism of the subject invention;

FIG. 5 is an end view taken along the line 5—5 of FIG. 4;

FIG. 6 is a side view of the drive plate which is connected to the drive block of FIGS. 4 and 5;

FIG. 7 is an end view taken along the line 7—7 of FIG. 6; and

DESCRIPTION OF A PREFERRED EMBODIMENT

Figure 8A:
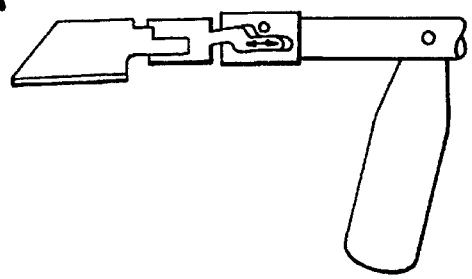
FIGS. 8A–8E are largely schematic views showing the different positions of the blade resulting from a single stroke of movement of the drive member.

Referring to FIG. 1, a reciprocating power saw, such as a recipro saw, is generally designated 10 and includes a housing or casing 12. It will be understood that only the nose portion of the tool is shown in FIG. 1. Tools of this type are well-known in the art and require no detailed description.

The housing 12 mounts a plurality of guide bars 14. It will be understood that these guide bars define a rectilinear guideway for slidably receiving a drive block, generally designated 16. Piston rod 18 has one end thereof connected to the drive block 16. It will be understood that the power tool 10 includes suitable powered means (not shown) for imparting reciprocal movement to the piston rod 18 and thus to the drive block 16.

Attention is now invited to FIGS. 4 and 5 showing the drive block 16 in more detail. (The drive block 16 as shown in FIGS. 4 and 5 differs slightly in proportion from the drive block as shown in the other figures which are largely schematic in form.) The drive block 16 is in the form of a block 20 having a recess 22 in one side thereof thus defining shoulders 24 and 26. The drive block 20 includes a step-shaped cavity or recess 28. The cavity 28 defines first, second and third arcuate cam surfaces 30, 32 and 34, respectively. It will be understood that the radii of these arcuate cam surfaces have a common center point. The cavity 28 includes an arcuate stop surface 36 between the arcuate cam surfaces 32 and 34. The recess 28 includes a further stop surface 38. Referring to FIG. 4, it is noted that the arcuate cam surface 30 is interrupted by a semi-cylindrical recess 40, the purpose of which will be explained below.

The drive mechanism also includes a plate 42 as seen in FIGS. 6 and 7. This plate is received within the recess 22 of the block 20. The plate 42 may be secured to the block 20 by a fastener (not shown) received within apertures 44 and 46 formed respectively in the block 20 and plate 42. It will be apparent that when the plate 42 is secured in the recess 22, the plate serves to close the step-shaped recess 22, such that the latter recess opens only at the forward end of the drive block. Of course, it will be understood that either the drive block 16 or plate 42 could be formed as an integral part of the plunger 18.

The orbital mechanism of the present invention includes a blade clamp, generally designated 50, and best shown in FIG. 3. The blade clamp includes a body portion 52 and an integral cam follower portion 54. The body portion includes one or more apertures or recesses to facilitate mounting a saw blade 56 (not shown in FIG. 3) of a known type.

The cam follower portion 54 includes first, second and third cam follower surfaces 58, 60 and 62, respectively. It will further be noted that the step-shaped cam follower portion of the blade clamp includes a first stop portion 64 and a second stop surface 66 disposed between the cam follower surfaces 60 and 62. It will be understood that the radii forming the cam surfaces 58, 60 and 62 are co-planar with the plane of the blade and have a common center. These radii could also be in a plane that is parallel to and offset from the plane of the blade.

It is seen that the step-shaped cam follower portion 54 of the blade clamp is received within the step-shaped recess 28 formed in the cam block 16, the latter being defined by the block 20 and the plate 42. It will further be understood that the various cam surfaces formed in the recess 28 are complimentary in shape with the cam follower surfaces on the step-shaped cam follower portion 54 of the blade clamp 50. Thus, the radius of the cam surface 30 is substantially the same as the radius of the cam follower surface 58 thus permitting smooth sliding engagement between these two surfaces. Further, the radius of the cam surface 32 is substantially the same as the radius of the cam follower surface 60, again permitting smooth sliding engagement between these two surfaces. Finally, the radius of the cam surface 34 is substantially the same as the radius of the cam follower surface 62 to permit smooth sliding engagement between these surfaces.

By reason of the step-shaped configuration of the recess 28 and the cam follower portion 54, the latter is trapped or captured within the recess 28. Forward movement of the cam follower 54 relative to the drive block will be limited by abutting engagement of the stop surface 64 engaging the stop surface 38 on the drive block. Inward movement of the cam follower relative to the cam block is limited by abutting engagement of the stop surface 66 with the stop surface 36 on the drive block.

Figure 8B:
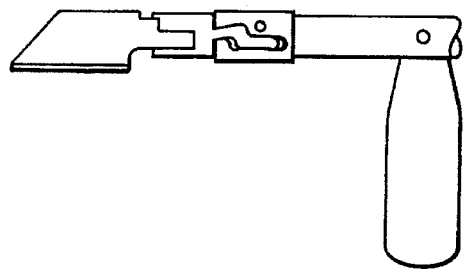
Figure 8C:
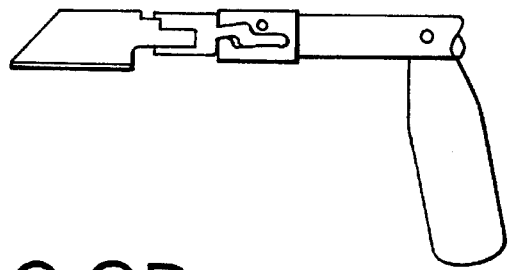
Figure 8D:
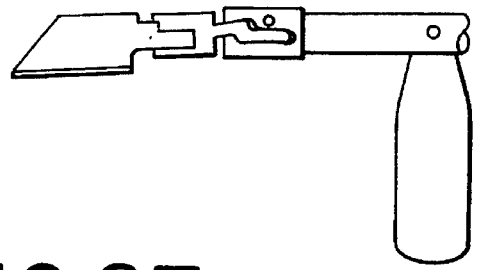
Figure 8E:
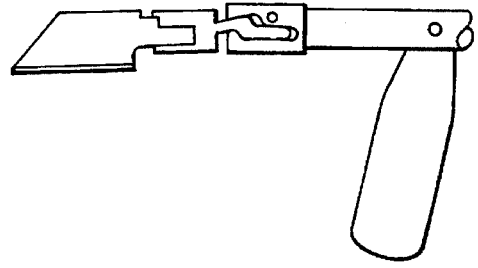

It will be apparent that reciprocal movement of the drive block 16 will impart corresponding reciprocal movement to the blade clamp 50 and consequently the blade 56 mounted therefrom. It is also apparent that there will be relative sliding movement between the cam follower portion 54 and the drive block 16, particularly when the blade 56 is engaged with the work to be cut. This relative sliding movement between the cam follower 54 and the drive block 16 will impart an orbital movement to the distal end of the blade 56 by reason of the configuration of the cam surfaces and cam follower surfaces described above. FIGS. 8A–8E show the various positions of the blade during a complete stroke of the drive block 16.

Referring to FIG. 3, it is noted that the cam follower portion 54 is provided with a pair of semi-cylindrical recesses 70 and 72; these surfaces open into the cam follower surface 58. When either one of these recesses is in registry with the recess 40 formed in the block 20, a cylindrical opening is formed for receipt of a locking pin 74 (FIG. 2). Thus, by reason of the pin 74, the blade clamp may be locked to the drive block thereby deactivating the orbital mechanism because relative movement between the cam follower portion 54 and the step-shaped recess 28 will no longer be permitted. The provision of the two semi-cylindrical recesses 70, 72 permit the blade to be locked in two different cant positions relative to the axis of reciprocation of the drive block 60. The orbital mechanism of the present invention readily lends itself to the establishment of an adjustable cant mechanism for the blade.

It is noted that the mechanism of the present invention is particularly unique in that it requires an absolute minimum of parts. As concerns simplicity of parts and operation, it is noted that the blade clamp 50 is solely mounted by reason of the interengagement between the cam follower portion 54 and the recess 28 in the drive block.

In the embodiment of the invention shown for purposes of illustration, the orbital and adjustable cant mechanism is shown as being an integral part of the power tool 10. It will be understood that the present invention may be formed as an attachment to convert a reciprocating saw without orbital action into a reciprocating saw with the orbital and adjustable cant mechanism.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

I claim:

1. A reciprocating saw mechanism comprising:
   (a) a housing having guide means defining a rectilinear guideway;
   (b) a drive member mounted by said guideway for reciprocating movement, said drive member having an arcuate cam surface;
   (c) powered means mounted in the housing and connected to said drive member for reciprocating the same;
   (d) a blade clamp for mounting a saw blade in a cutting plane, said blade clamp having an arcuate cam follower in engagement with said arcuate cam surface, the blade clamp being mounted by the drive member for limited relative movement with respect thereto;
   (e) the arcuate cam surface and the arcuate cam follower being defined by respective radii contained in a plane parallel with the cutting plane;
   (f) whereby upon reciprocation of said drive member and upon engagement with a work piece by a blade mounted by said blade clamp an orbital movement will be imparted to the blade.

2. The mechanism of claim 1 further defined by first and second interengaging stop means formed on said drive member and blade clamp, respectively, for limiting relative movement between the drive member and the blade clamp.

3. The mechanism of claim 2 wherein the interengagement between the drive member and the blade clamp serves as the sole means supporting the blade clamp.

4. The mechanism of claim 1 further defined by locking means mounted by the drive member for locking the blade clamp to the drive member at any selected relative position between the blade clamp and the drive member.

5. A reciprocating saw mechanism comprising:
   (a) a housing having guide means defining a rectilinear guideway;

(b) a drive block mounted by said guideway for reciprocating movement;

(c) powered means in the housing and connected to said drive block for reciprocating the same;

(d) a blade clamp for mounting a saw blade in a cutting plane;

(e) one of said drive block and said blade clamp having an internal cavity with at least one arcuate cam surface, the other of said drive block and said blade clamp having external cam follower received with said cavity and including at least one arcuate cam follower surface in engagement with said arcuate cam surface, other interengaging surfaces on the drive block and blade clamp, respectively, for maintaining the arcuate cam surface and the arcuate cam follower surface in limited sliding engagement with each other and cooperating with the arcuate cam surface and the arcuate cam follower surface for mounting said blade clamp on said drive block;

(f) the arcuate cam surface and the arcuate cam follower surface being defined by respective radii contained in a plane parallel with the cutting plane;

(g) whereby upon reciprocation of said drive block and upon engagement with a work piece by a blade mounted by said blade clamp an orbital movement will be imparted to the blade.

6. The reciprocating saw mechanism according to claim 5 wherein the arcuate cam surface and at least one of the other interengaging surfaces are defined by walls forming said cavity at least in part.

7. The mechanism of claim 5 wherein the interengagement between said cavity and said cam follower serves as the sole means supporting the blade clamp.

8. The mechanism according to claim 5 further defined by locking means mounted by the drive block for locking the blade clamp to the drive block at any selected relative position between the blade clamp and the drive block.

* * * * *